(12) United States Patent
Bergsma et al.

(10) Patent No.: US 7,014,450 B2
(45) Date of Patent: Mar. 21, 2006

(54) THERMOPLASTIC SHEET FORMING APPARATUS AND METHOD

(75) Inventors: Bryan Bergsma, Spokane, WA (US); Tom Courrier, Coeur D Alene, ID (US); W. Forrest Frantz, North Bend, WA (US); John Hennessy, Cheney, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/435,843

(22) Filed: May 12, 2003

(65) Prior Publication Data

US 2004/0026826 A1    Feb. 12, 2004

Related U.S. Application Data

(63) Continuation-in-part of application No. 10/215,815, filed on Aug. 9, 2002.

(51) Int. Cl.
*B29C 53/04* (2006.01)

(52) U.S. Cl. .................. 425/363; 425/373; 425/392; 425/DIG. 14

(58) Field of Classification Search ........ 425/362–365, 425/373, 392, DIG. 14; 156/95, 156–158, 156/285–287
See application file for complete search history.

(56) References Cited

U.S. PATENT DOCUMENTS

| 3,388,017 | A |   | 6/1968  | Grimsley et al. |
|-----------|---|---|---------|-----------------|
| 4,068,622 | A |   | 1/1978  | Vola |
| 4,478,670 | A | * | 10/1984 | Heyse et al. ................. 156/200 |
| 4,559,765 | A |   | 12/1985 | Cress et al. |
| 4,657,623 | A | * | 4/1987  | Wesch ......................... 156/195 |
| 4,875,960 | A | * | 10/1989 | Shinomiya et al. .......... 156/203 |
| 5,225,016 | A |   | 7/1993  | Sarh |
| 5,310,443 | A | * | 5/1994  | Burger ....................... 156/466 |
| 5,505,813 | A |   | 4/1996  | Scheifele et al. |
| 5,635,014 | A |   | 6/1997  | Taylor |
| 5,714,738 | A | * | 2/1998  | Hauschulz et al. .......... 264/299 |
| 5,840,347 | A | * | 11/1998 | Muramatsu et al. ........ 425/384 |
| 6,284,089 | B1|   | 9/2001  | Anderson et al. |

OTHER PUBLICATIONS

CETEX® Application in Ducting; Ten Cate Advanced Composites Technical Document Nr ITD5235.017; Oct. 1990; pp. 1-10; Nijverdal, The Netherlands.

A short not on Duct Manufacturing for Aircraft Environmental Control Systems using CETEX Continuous fiber reinforced thermoplastic; Ten Cate Advanced Composites Technical Document Nr ITD5241.002; 1992; pp. 1-6; Nijverdal, The Netherlands.

\* cited by examiner

*Primary Examiner*—Duane Smith
*Assistant Examiner*—Thu Khanh T. Nguyen
(74) *Attorney, Agent, or Firm*—Alston & Bird LLP

(57) ABSTRACT

There are provided apparatuses and related methods for forming sheets. The formed sheets can be formed of a thermoplastic material, such as flat sheets of reinforced thermoplastic, which can be lightweight, strong, and perform well in flammability, smoke, and toxicity tests. The apparatus includes a heater for heating the sheet to a processing temperature and a structure for configuring the sheet to a desired shape using one or more rollers, shapers, longitudinal members, and/or support members.

13 Claims, 6 Drawing Sheets

THERMOPLASTIC SHEET FORMING APPARATUS AND METHOD

CROSS-REFERENCE TO RELATED APPLICATIONS

This application is a continuation-in-part of copending U.S. patent application Ser. No. 10/215,815, filed on Aug. 9, 2002, which is hereby incorporated herein in its entirety by reference.

BACKGROUND OF THE INVENTION

1) Field of the Invention

The present invention relates to apparatuses and methods for forming thermoplastic materials and, more specifically, to apparatuses and methods for bending thermoplastic sheets to form ducts, channels, arcs, spirals, and the like.

2) Description of Related Art

Longitudinal passages such as ducts, channels, arcs, spirals, and the like are used to provide passageways for a wide variety of applications. For example, tubular ducts are widely used for air flow in aircraft environmental control systems. Similarly, ducts provide passageways for transporting gases for heating and ventilation in other vehicles and in buildings. Water distribution systems, hydraulic systems, and other fluid networks also often use ducts for fluid transport. In addition, solid materials, for example, in particulate form can be delivered through ducts and channels. A variety of longitudinal shapes can also be used as conduits in which electrical wires or other components are placed. Such longitudinal passages for the foregoing and other applications can be formed of metals, plastics, ceramics, composites, and other materials.

One conventional aircraft environmental control system utilizes a network of ducts to provide air for heating, cooling, ventilation, filtering, humidity control, and/or pressure control of the cabin. In this conventional system, the ducts are formed of a composite material that includes a thermoset matrix that impregnates, and is reinforced by, a reinforcing material such as Kevlar®, registered trademark of E.I. du Pont de Nemours and Company. The thermoset matrix is typically formed of an epoxy or polyester resin, which hardens when it is subjected to heat and pressure. Ducts formed of this composite material are generally strong and lightweight, as required in many aircraft applications. However, the manufacturing process can be complicated, lengthy, and expensive, especially for ducts that include contours or features such as beads and bells. For example, in one conventional manufacturing process, ducts are formed by forming a disposable plaster mandrel, laying plies of fabric preimpregnated with the thermoset material on the mandrel, and consolidating and curing the plies to form the duct. The tools used to mold the plaster mandrel are specially sized and shaped for creating a duct of specific dimensions, so numerous such tools must be produced and maintained for manufacturing different ducts. The plaster mandrel is formed and destroyed during the manufacture of one duct, requiring time for curing and resulting in plaster that typically must be removed or destroyed as waste. Additionally, the preimpregnated plies change shape during curing and consolidation and, therefore, typically must be trimmed after curing to achieve the desired dimensions. The jigs required for trimming and for locating the proper positions for features such as holes and spuds are also typically used for only a duct of particular dimensions, so numerous jigs are required if different ducts are to be formed. Like the tools used for forming the mandrels, the jigs require time and expense for manufacture, storage, and maintenance. Additionally, ducts formed of conventional thermoset epoxies typically do not perform well in certain flammability, smoke, and toxicity tests, and the use of such materials can be unacceptable if performance requirements are strict. Further, features such as beads typically must be post-formed, or added after the formation of the duct, requiring additional manufacture time and labor.

Alternatively, ducts can be formed of thermoplastic materials. A thermoplastic duct can be manufactured by cutting a sheet of thermoplastic material to a size and shape that corresponds to the desired dimensions of the duct, bending the sheet to the desired configuration, and joining longitudinal edges of the sheet to form a longitudinal joint or seam. For example, apparatuses and methods for forming thermoplastic ducts and consolidation joining of thermoplastic ducts are provided in U.S. application Ser. Nos. 10/216,110 and 10/215,833, titled "Thermoplastic Laminate Duct" and "Consolidation Joining of Thermoplastic Laminate Ducts," both filed on Aug. 9, 2002 and assigned to the Assignee of the present invention. Such thermoplastic ducts can be formed by retaining the thermoplastic sheet in the bent configuration until the ends are joined, and then releasing the duct so that the resulting joint continues to restrain the duct in the bent configuration. However, stresses induced in the thermoplastic material during bending can cause the duct to deform or distort from the desired configuration after joining, e.g., when released from the joining apparatus.

Thus, there exists a need for improved apparatuses and methods for forming a thermoplastic sheet to correspond generally to a desired configuration in a substantially unstressed condition. The method should not require the laying of individual plies on a disposable plaster mandrel. Preferably, the method should be compatible with thermoplastic ducts, including reinforced thermoplastic ducts formed from flat sheets, which provide high strength-to-weight ratios and meet strict flammability, smoke, and toxicity standards.

SUMMARY OF THE INVENTION

The present invention provides an apparatus and method for forming sheets to desired configurations. The sheets can be formed to the desired configuration of a finished shape such as an arc, channel, or spiral. Alternatively, each sheet can be formed as a preform that generally corresponds to the desired configuration of a finished shape such as a duct and is subsequently joined to form the finished shape. Joining can be accomplished by consolidation joining. The sheets can be formed from thermoplastic materials, such as flat sheets of reinforced thermoplastic laminate that are lightweight, strong, and perform well in flammability, smoke, and toxicity tests.

According to one embodiment of the present invention, the apparatus includes a rotatable roller, an elastically flexible shaper, and a heater. The apparatus can be used to hold the sheet in a predetermined configuration while the heater is used to heat the sheet. The shaper receives the thermoplastic sheet on one side so that rotation of the roller advances the shaper around the roller to bend the thermoplastic sheet. An index feature can be provided on the shaper for engaging the thermoplastic sheet so that the adjustment of the index feature toward the roller advances the thermoplastic sheet around the roller. The apparatus can also include a second shaper that is disposed on the thermoplastic sheet so that the second shaper is bent between the sheet and the roller and advancement of the second shaper toward the roller urges the thermoplastic sheet radially outward from the roller. Longitudinal members can be configured to adjust radially toward the roller to bend the thermoplastic sheet to a predetermined configuration.

According to another embodiment of the present invention, the apparatus includes at least two support members that extend, for example, in a longitudinal direction, to define at least one space therebetween. A shaper is configured to be disposed with one side against the support members so that the shaper extends across the at least one space. The shaper receives the thermoplastic sheet on a side opposite the support members and bends partially around the members, which can be adjustable. A heater is configured to heat the thermoplastic sheet to a processing temperature less than a glass transition temperature of the thermoplastic member and within about 70° F. of the glass transition temperature.

The present invention also provides a method of forming a thermoplastic sheet. According to one embodiment of the present invention, the thermoplastic sheet is disposed on a first side of a shaper. A longitudinal roller connected to the shaper is then rotated, for example, by at least one revolution, to advance the shaper circumferentially around the roller so that the thermoplastic sheet is disposed between the roller and the shaper and bent to a predetermined shape. Longitudinal members can be radially adjusted toward the roller to bend the thermoplastic sheet to a predetermined configuration. The shaper can be advanced toward the roller so that the shaper adjusts radially outward from the roller to define a maximum size for the thermoplastic sheet, for example, so that an index feature of the shaper engages the sheet and adjusts the sheet radially outward from the roller. According to one aspect, a second shaper is disposed on the sheet so that the second shaper is advanced around the roller between the sheet and the roller. The second shaper can be adjusted radially outward from the roller to urge the thermoplastic sheet to a predetermined configuration. The thermoplastic sheet is heated to a processing temperature, for example, within about 70° F. of a glass transition temperature of the thermoplastic sheet. The thermoplastic sheet can be cooled in the apparatus to a temperature below about 70° F. less than the glass transition temperature before the sheet is removed.

According to another embodiment of the present invention, at least two support members are provided with a space therebetween. A shaper is disposed on the support members so that the shaper extends across the space and bends partially around the support members to a predetermined shape. A thermoplastic sheet is disposed on the shaper and heated to a processing temperature. The thermoplastic sheet can be cooled to a temperature below about 70° F. less than the glass transition temperature of the thermoplastic sheet while the thermoplastic sheet and the shaper are disposed on the support members. The support members can be adjustable. According to one aspect, a second shaper can be disposed on the thermoplastic sheet opposite the first shaper and some of the support members can be adjusted in a direction toward the sheet so that the sheet is bent between the support members.

BRIEF DESCRIPTION OF THE DRAWINGS

Figure 1:
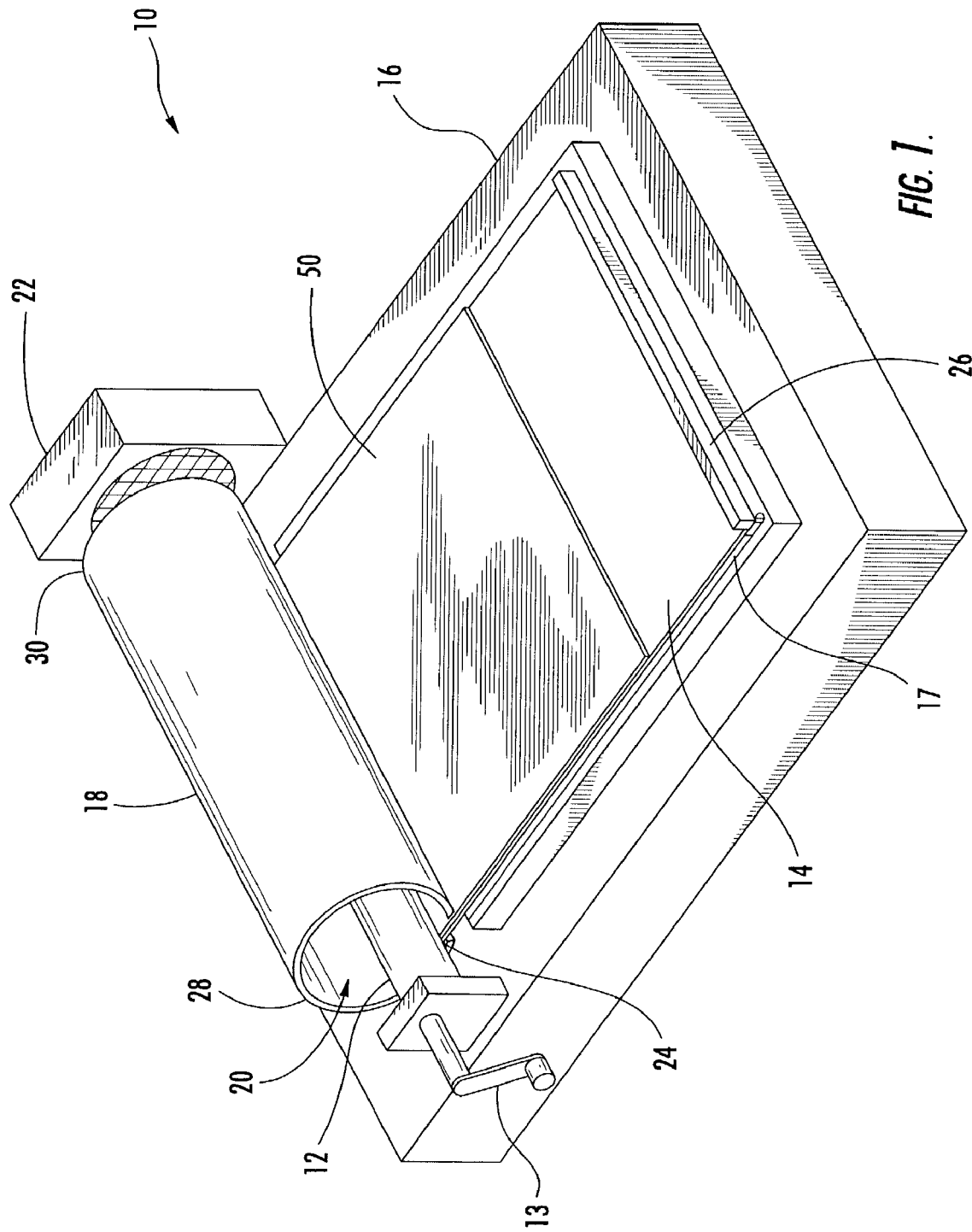
Figure 2:
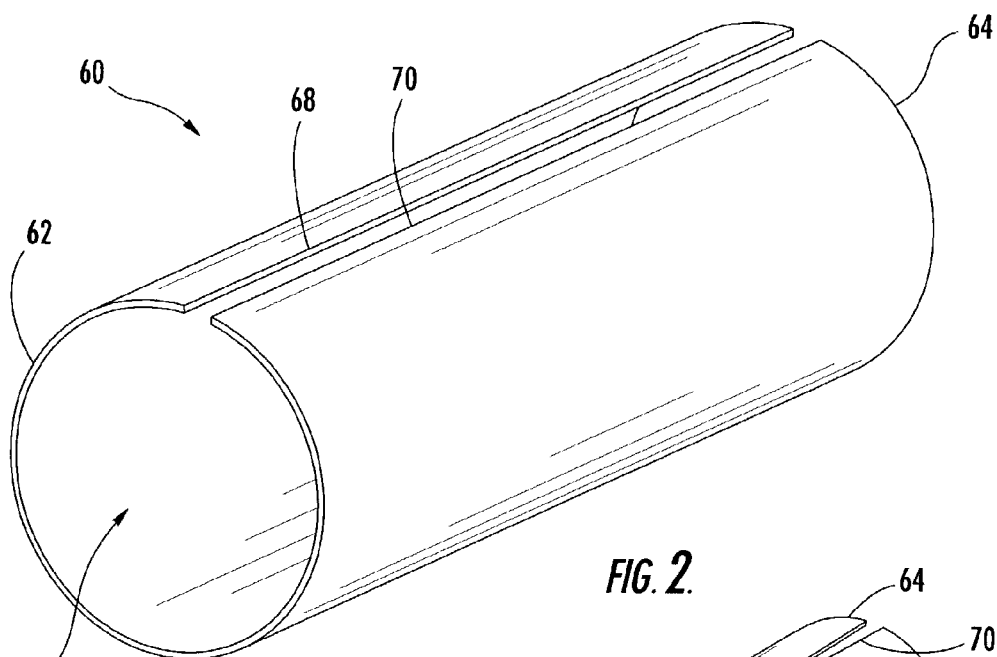
Figure 2A:
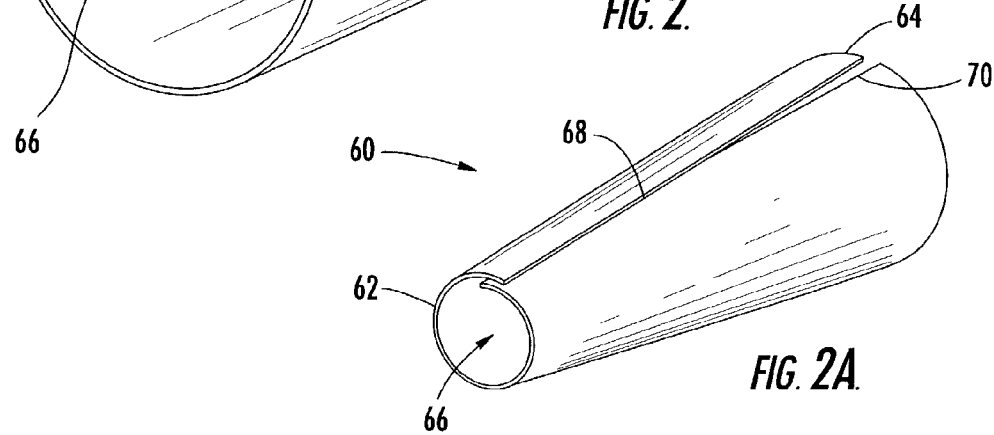
Figure 3:
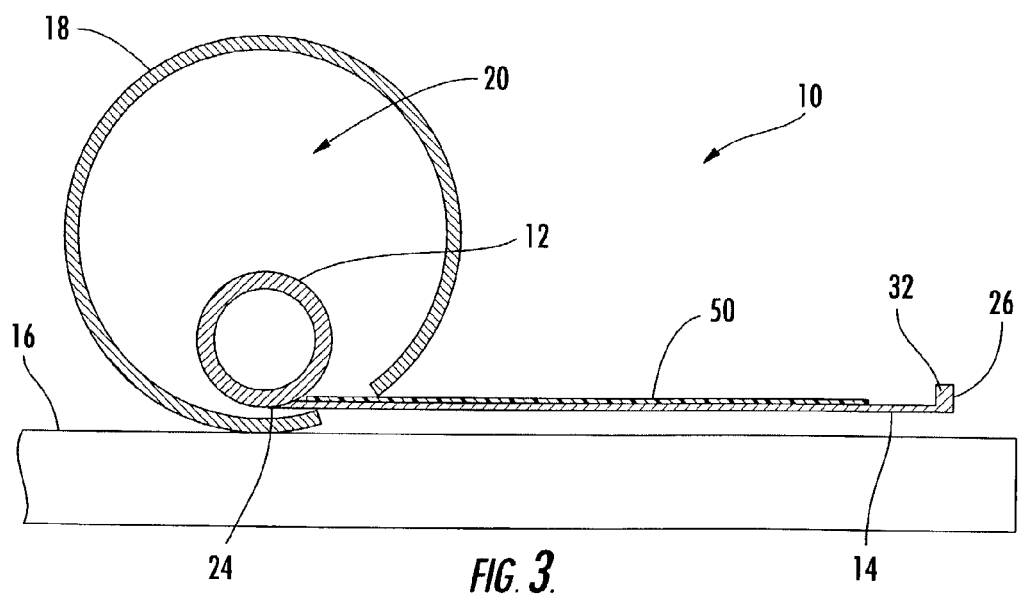
Figure 4:
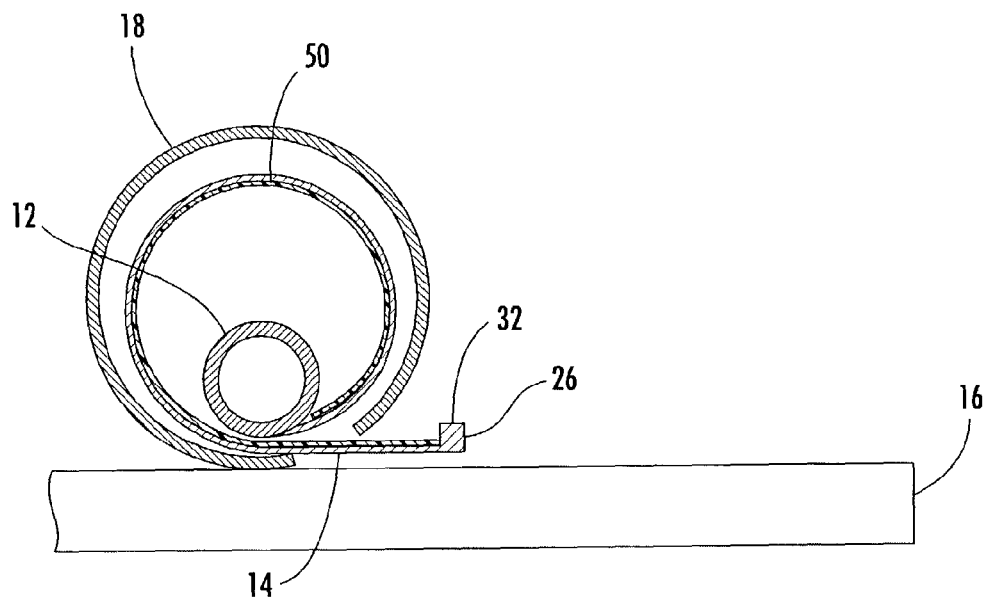
Figure 5:
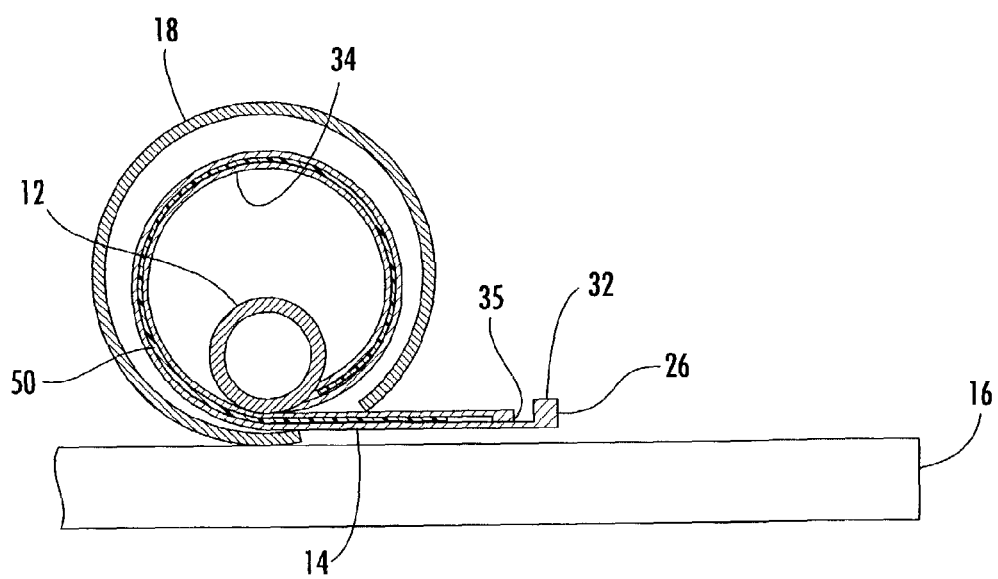
Figure 6:
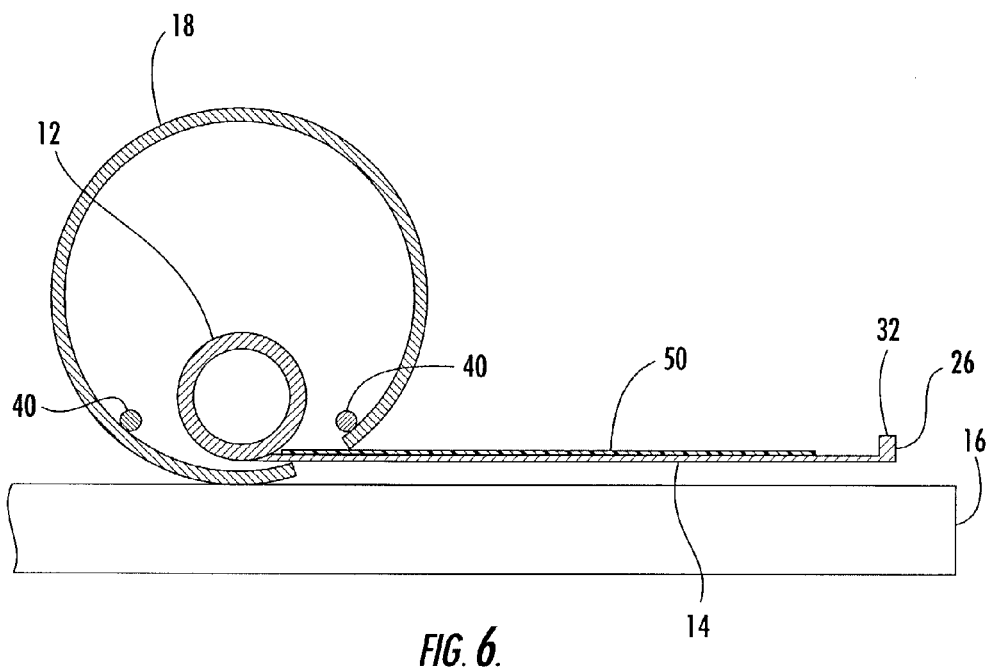
Figure 7:
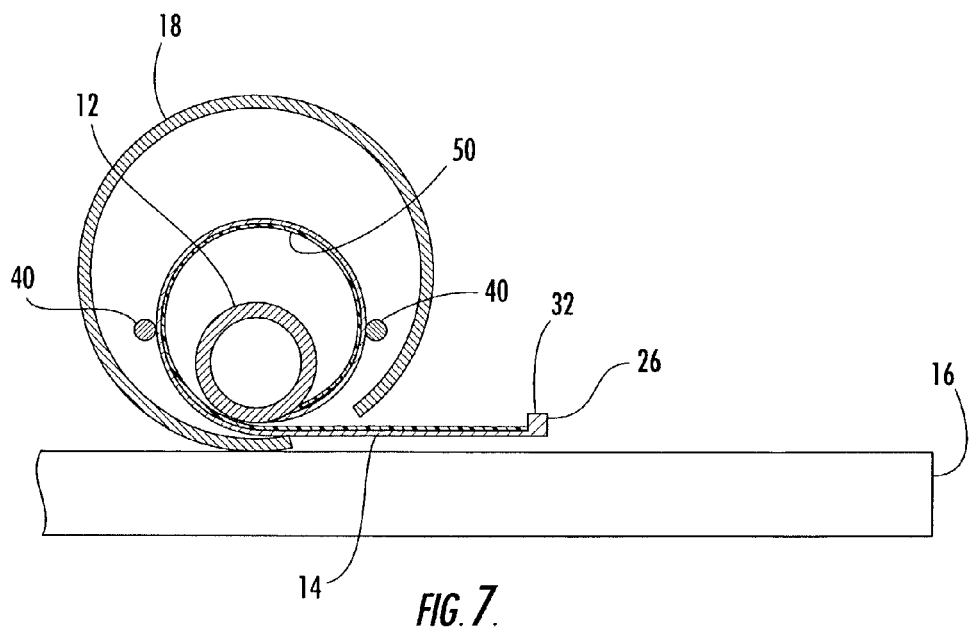
Figure 8:
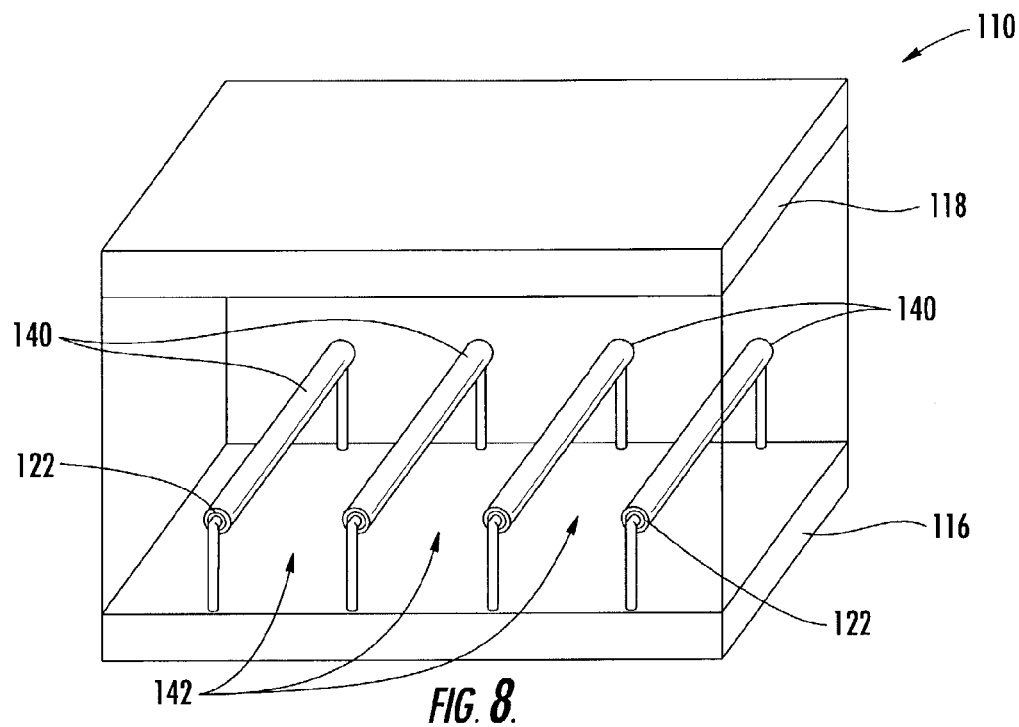
Figure 9:
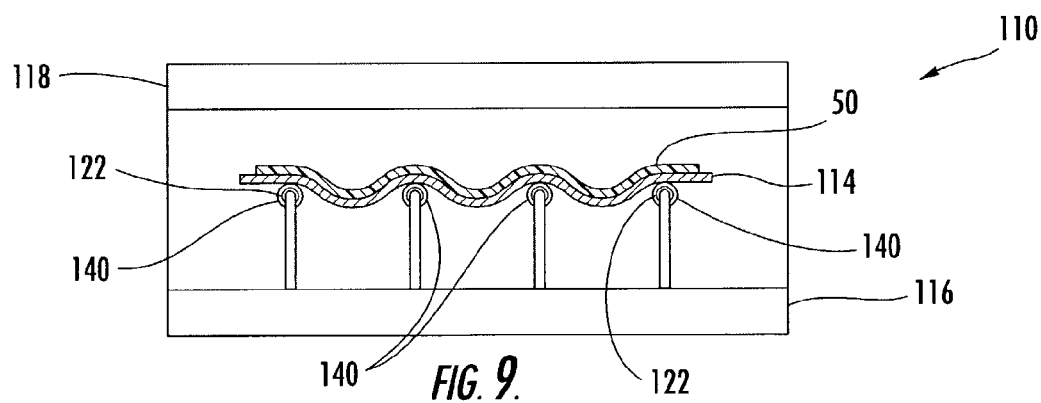
Figure 10:
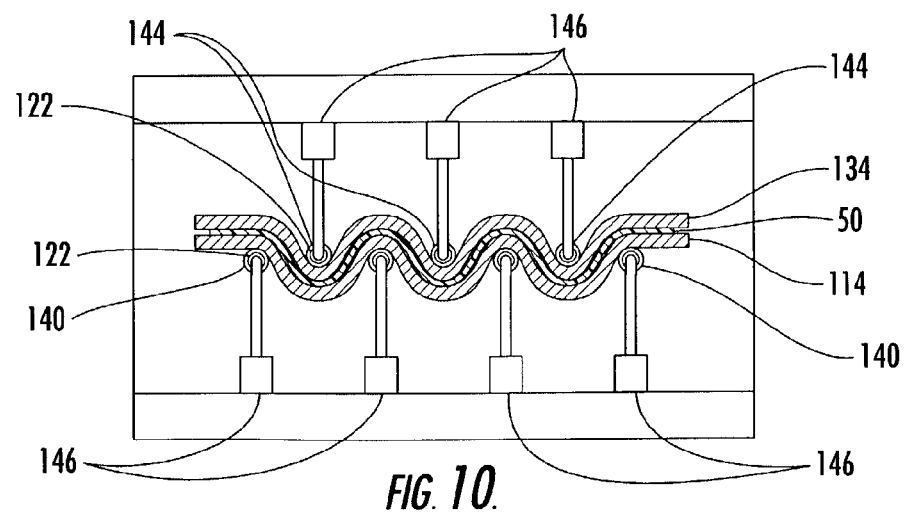
Figure 11:
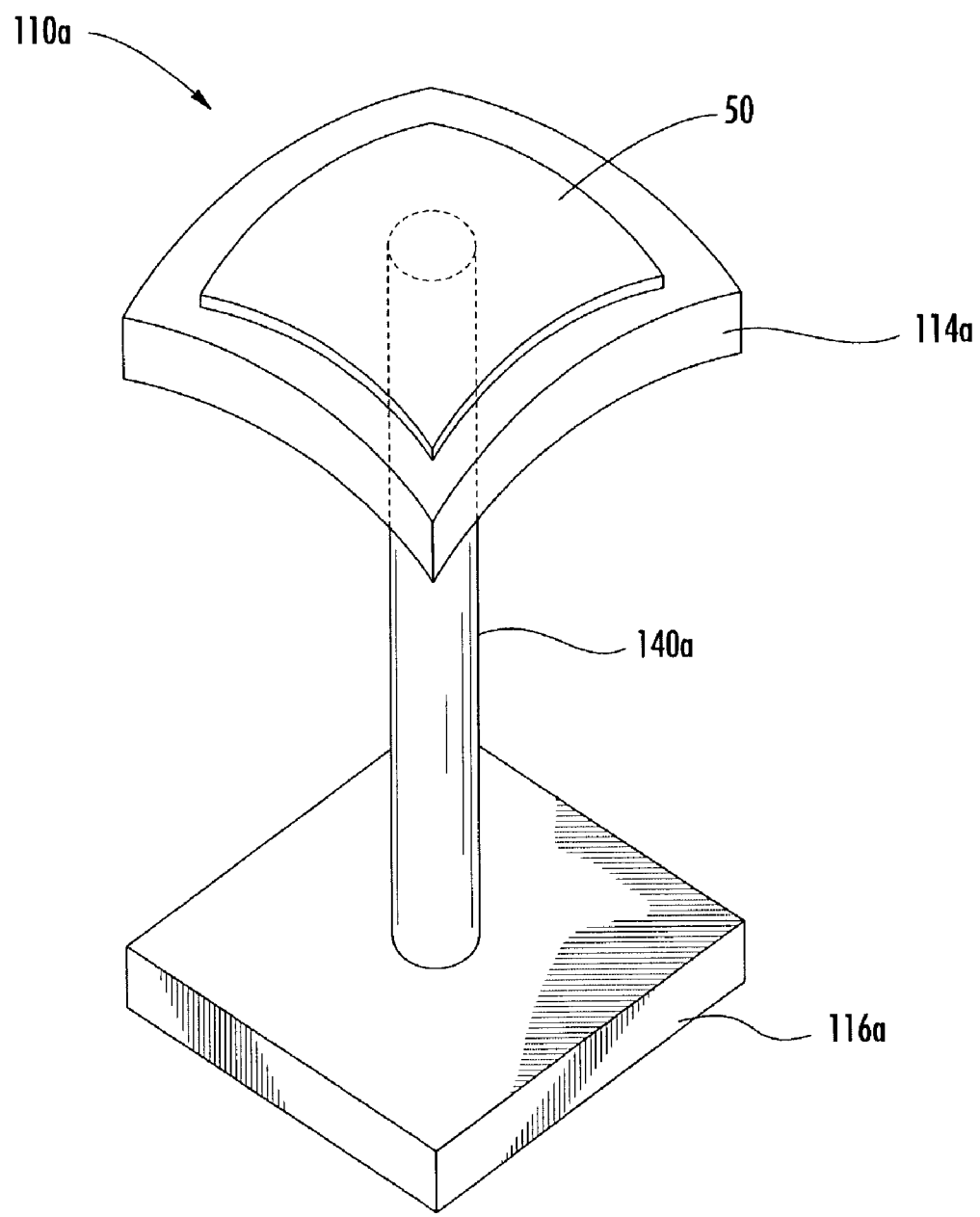

Having thus described the invention in general terms, reference will now be made to the accompanying drawings, which are not necessarily drawn to scale, and wherein:

FIG. 1 is a perspective view illustrating a forming apparatus according to one embodiment of the present invention;

FIG. 2 is a perspective view illustrating a formed sheet according to one embodiment of the present invention;

FIG. 2A is a perspective view illustrating a formed sheet according to another embodiment of the present invention;

FIG. 3 is a section view illustrating the forming apparatus of FIG. 1, shown with the shaper in a first position;

FIG. 4 is a section view illustrating the forming apparatus of FIG. 1, shown with the shaper advanced to a second position;

FIG. 5 is a section view illustrating a forming apparatus according to another embodiment of the present invention, shown with a second shaper disposed on the sheet and both shapers advanced to the second position;

FIG. 6 is a section view illustrating a forming apparatus according to another embodiment of the present invention, shown with the shaper in a first position and with longitudinal members in a first position;

FIG. 7 is a section view illustrating the forming apparatus of FIG. 6, shown with the shaper in a second position and with the longitudinal members in a second position;

FIG. 8 is a perspective view illustrating a forming apparatus according to another embodiment of the present invention;

FIG. 9 is a section view illustrating the forming apparatus of FIG. 8, shown with a thermoplastic sheet and a shaper disposed on the support members;

FIG. 10 is a section view illustrating a forming apparatus with a second set of support members, according to another embodiment of the present invention; and FIG. 11 is a perspective view illustrating a forming apparatus according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, there is shown a forming apparatus 10 for forming a formed sheet 60, such as the one shown in FIG. 2, from a thermoplastic member, such as a thermoplastic sheet 50. Forming generally refers to bending the thermoplastic member to a bent or curved configuration and processing the member, for example, using heat, so that the member generally remains in a desired configuration when unrestrained. The formed sheet 60 can be a finished shape, such as an arc, spiral, channel, and the like. Alternatively, the formed sheet 60 can be used as a preform, i.e., a formed shape that is joined or otherwise processed to form a finished shape and remains in the desired configuration when unrestrained. For example, the flat sheet 50 can be bent and heated to form the cylindrical formed sheet 60, shown in FIG. 2, which extends from a first end 62 to a second end 64 and defines a passage 66. Longitudinal edges 68, 70 of the formed sheet 60 can define a gap therebetween, can be overlapped, or can be joined to form a seam or joint. If used as a preform, the longitudinal edges 68, 70 of the formed sheet 60 can be joined to form a duct which, when unrestrained, defines a partially closed cylindrical shape. The preform can be formed to have a diameter slightly larger or smaller than the desired diameter of the duct. Thereafter, the formed sheet 60 can be subjected to a compressive or expansion force for holding the formed sheet during subsequent processing, such as joining, to arrive at the desired configuration of the duct. The longitudinal edges 68, 70, or other portions of the formed sheet 60, can be joined using adhesives, heat, or other joining methods. For example, joining can be achieved by applying heat and pressure to the edges 68, 70 to form the seam. As the thermoplastic material of the formed sheet 60 is heated above its glass transition temperature, the material becomes plastic and the pressure consolidates and joins the interface. Joining can be performed by manual or automated methods, for example, as described in U.S. application Ser. No. 10/215,833, titled "Consolidation Joining of Thermoplastic Laminate Ducts," the entirety of which is incorporated herein by reference. Thus, as used throughout this application, the term "formed sheet" refers generally to a sheet that has been formed to a curved or bent configuration, including sheets that are formed to a final desired configuration without joining, preforms that require joining or other processing to achieve the final configuration, and partially closed shapes that are formed by joining such preforms.

The shape of the formed sheet 60 is determined by projecting the desired shape of the formed sheet 60 onto the flat sheet 50. Although the ends 62, 64 and edges 68, 70 of the formed sheet 60 are shown to be straight and parallel in FIG. 2, the formed sheet 60 can alternatively be straight, curved, tapered, or otherwise contoured. For example, there is shown in FIG. 2A an alternative formed sheet 60, which defines a non-uniform, or transitional, radius that tapers between the ends 62, 64. The sheet 50 and, hence, the formed sheet 60 can also define a variety of features such as holes, for example, for connecting spuds, brackets, and the like to the formed sheet 60. Methods and apparatuses for forming sheets and for determining geometric patterns that correspond to ducts are provided in U.S. application Ser. No. 10/216,110, titled "Thermoplastic Laminate Duct," the entirety of which is incorporated herein by reference. It is also appreciated that marks can be provided on the formed sheet 60, for example, to accurately identify the location of post-formed features such as beads, bells, and assembly details or to facilitate the manufacture or assembly of the formed sheet 60, as also provided in the application entitled "Thermoplastic Laminate Duct."

Preferably, the formed sheet 60 is formed of a thermoplastic sheet or of a composite laminate that includes a thermoplastic matrix and a reinforcing material. Thermoplastic materials are characterized by a transition to a plastic state when heated above a glass transition temperature. For example, the formed sheet 60 can be formed of polyetherimide (PEI) or polyphenol sulfide (PPS), both of which can be thermoplastic. Thermoplastic PEI is available under the trade name Ultem®, a registered trademark of General Electric Company. According to one embodiment of the present invention, each formed sheet 60 is comprised of a composite material that includes a matrix of thermoplastic PEI that is reinforced with a reinforcing material such as carbon, glass, or an aramid fabric such as a Kevlar® aramid, or fibers of such a material. Alternatively, the formed sheet 60 can be formed of other thermoplastic materials, which can be reinforced by other reinforcing materials, or can include no reinforcing materials.

The formed sheet 60 can be used in numerous applications including, but not limited to, environmental control systems of aerospace vehicles. For example, the formed sheet 60 can be used as a preform that is used to form a duct, as described above. The resulting duct can be used as a passage in a system though which air is delivered to provide heating, cooling, ventilation, and/or pressurization of an aircraft cabin. Alternatively, the formed sheet 60 can be used without further processing, for example, as a channel or conduit for wires or cables. The ends of the formed sheet 60 can be connected to other channels, ducts, tubes, formed sheets, or other devices such as ventilators, compressors, filters, and the like. Multiple formed sheets 60 can be connected so that a longitudinal axis of each formed sheet 60 is configured at an angle relative to the longitudinal axis of the adjoining formed sheet(s). Thus, the formed sheet 60 can be connected to form an intricate passage system (not shown) that includes numerous angled or curved passages for accommodating the various devices connected by the passage system and for meeting layout restrictions as required, for example, on an aircraft where space is limited. In addition, formed sheets according to the present invention can be used to form barriers or walls that are used to separate lighted areas from darker areas, people from secure areas, or cold from warm areas. Further, the formed sheets can provide visual barriers.

The forming apparatus 10 shown in FIG. 1 includes a roller 12 and a shaper 14, both of which are provided on a frame 16. The roller 12 extends longitudinally and is supported by the frame 16 such that the roller 12 is rotatable. The roller 12 can be at least partially surrounded by an insulative heat shroud 18, which extends parallel to the roller 12 and facilitates the heating of a space 20 within the shroud 18 by a heater 22. The heater 22 can be any of various types of heaters such as electric and gas heaters, and can be positioned on either end of the shroud 18 or along the longitudinal length of the shroud 18. The heater 22 can be configured to heat the sheet 50 through the shroud 18 or by heating air that is blown into the space 20 within the shroud 18. Alternatively, the apparatus 10 can be used without the shroud 18, and the heater 22 can be configured to heat the space around the roller 12. The roller 12 can also be heated directly by a heater, for example, by an electric heater disposed within the roller 12.

The shaper 14 is an elastically flexible laminar sheet, i.e., a sheet that can be bent from its initial configuration during forming without undergoing any appreciable plastic deformation so that the shaper 14 can return to its initial configuration after processing and can be re-used. The shaper 14 can be formed of a variety of materials, including, for example, a sheet of stainless steel which is about 0.015 inches thick. In the illustrated embodiment, the shaper 14 is configured so that a first edge 24 is parallel to the roller 12 and connected to the roller 12, though in other embodiments, the first edge 24 can be oriented in other configurations and need not be connected to the roller 12. The shaper 14 is slidably adjustable relative to the roller 12 so that a second edge 26 of the shaper 14 opposite the first edge 24 is adjustable between first and second positions. In the first position, the shaper 14 extends from the roller 12 as shown in FIGS. 1 and 3. In the second position, the second edge 26 of the shaper 14 is adjusted toward the roller 12 and the shaper 14 is at least partially bent around the roller 12, as shown in FIG. 4. The shaper 14 can engage tracks 17 or other features provided on the frame 16, which maintain the second edge in a parallel arrangement with the roller 12. By the term "advanced" it is generally meant that a portion of the shaper 14 that is not bent around the roller 12 is adjusted toward the roller 12 to increase the portion of the shaper 14 that is bent around the roller 12, for example, by increasing the diameter of the portion bent around the roller 12 or by further extending the shaper 14 circumferentially around the roller 12. If the apparatus 10 is configured as shown in FIGS. 3 and 4, the shaper 14 can be advanced by adjusting the second edge 26 toward the roller 12.

Adjustment of the shaper 14 to the second position can be accomplished by rotating the roller 12 in a first direction, clockwise as shown in FIGS. 3 and 4, so that the first edge 24 of the shaper 14 rotates around at least part of the roller 12, the shaper 14 bends, and the second edge 26 of the shaper 14 is advanced toward the roller 12. As the roller 12 is rotated in a second direction, counterclockwise in FIGS. 3 and 4, the shaper 14 unrolls from the roller 12 and the second edge 26 is retracted from the roller 12. The roller 12 can be actuated by an automated device such as an electric motor or the roller can be manually actuated, for example, by a crank 13 that is rotated by an operator. Alternatively, the roller 12 can be configured to rotate freely so that the shaper 14 can be advanced toward the roller 12, either manually or by an actuator, thereby rotating the roller 12 and rolling the shaper 14 around the roller 12. In another embodiment, the first edge 24 of the shaper 14 is not connected to the roller 12, and the shaper 14 can be advanced into the shroud 18 so that the shaper 14 bends around the roller 12, which can remain stationary. In either case, the second edge 26 of the shaper 14 can be adjusted relative to the roller 12 while the roller 12 is held in place so that a portion of the shaper 14 that is disposed around the roller 12 is adjusted radially outward from the roller 12 to a desired configuration, generally defining a maximum circumference of the sheet 50, as described further below.

The extent to which the shaper 14 is rolled around the roller 12 can be determined according to the desired shape of the formed sheet 60. For example, the shaper 14 and thermoplastic sheet 50 can be advanced slightly more than one revolution around the roller 12 so that the resulting formed sheet 60 defines a generally cylindrical shape with overlapping longitudinal edges that can be joined to form a tubular duct. Alternatively, the sheet 50 can be rotated less than one revolution around the roller 12 to form an arc or, channel, or spiral, or the sheet 50 can be rotated more than one revolution to form a spiral shape.

During operation, the thermoplastic sheet 50 is disposed on the shaper 14 as shown in FIG. 1 so that the sheet 50 is rolled around the roller 12 between the shaper 14 and the roller 12. While the sheet 50 is supported between the shaper 14 and the roller 12, the heater 22 can be used to heat the sheet 50, e.g., by connecting a power supply (not shown) to the heater 22 and energizing the heater 22. Preferably, the sheet 50 is heated to a processing temperature that is less than the glass transition temperature of the thermoplastic material of the sheet 50. For example, the processing temperature can be between about 5° F. and 70° F. less than the glass transition temperature. In the case of PEI, which has a glass transition temperature of about 417° F., the sheet 50 can be heated to a processing temperature of between about 347° F. and 412° F. The sheet 50 can be maintained at the processing temperature for a predetermined period, such as about 10 minutes, after which the heater 22 can be turned off and the formed sheet 60 is preferably at least partially cooled in the apparatus 10. The formed sheet 60 can be removed from the apparatus 10 through openings 28, 30 at the longitudinal ends of the heat shroud 18, or the heat shroud 18 can be configured to disassemble or otherwise open to facilitate the removal of the formed sheet 60. Alternatively, the formed sheet 60 can be removed by reversing the load process, i.e., unwinding the formed sheet 60 from the heat shroud 18 in a direction opposite to the direction in which the sheet 50 is inserted so that the formed sheet 60 unwinds around the outside of the heat shroud 18.

The thermoplastic sheet 50 can be a precut sheet that corresponds to the desired dimensions of the formed sheet 60 so that the formed sheet 60 is trimmed only slightly or not at all after processing in the apparatus 10. Alternatively, the thermoplastic sheet 50 can be part of a long continuous sheet, such as a roll of thermoplastic laminar material, and the sheet 50 can be cut during or after processing. In either case, the shaper 14 can include an index feature that engages a portion of the sheet 50 so that the adjustment of the sheet 50 into the apparatus 10 can be easily controlled and/or measured. For example, the shaper 14 can include a gate 32 at the second edge 26, as shown in FIGS. 1, 3, and 4. The sheet 50 can be disposed on the shaper 14 so that an edge of the sheet 50 rests against the gate 32, and the gate 32 prevents the sheet 50 from slipping relative to the shaper 14 when the shaper 14 is advanced around the roller 12.

According to one embodiment of the present invention, the sheet 50 is disposed on the shaper 14, and the roller 12 is rotated through a predetermined angle of rotation. The roller 12 can be rotated using the actuator or crank 13, or the second edge 26 of the shaper 14 can be urged toward the roller 12 to rotate the roller 12. The roller 12 is then held at the desired rotational position while the second edge 26 of the shaper 14 is adjusted toward or away from the roller 12 to increase or decrease the diameter of a generally cylindrical portion of the shaper 14 bent around the roller 12. By keeping the second edge 26 parallel to the first edge 24, a constant radius can be imparted to the formed sheet 60. Alternatively, the second edge 26 can be positioned in a non-parallel, or skewed, relationship relative to the first edge 24 so that a non-uniform, or transitional radius, is imparted to the formed sheet 60, i.e., the radius at one end 66 is different than the other end 64 of the formed sheet 60.

The shaper 14 also adjusts the sheet 50 to a desired configuration. For example, the sheet 50 can be engaged by the gate 32, and the gate 32 can be adjusted toward the roller 12 so that substantially all of the sheet 50 is bent around the roller 12. Thus, if the sheet 50 is long enough to extend substantially from the first edge 24 of the shaper 14 to the gate 32, the sheet 50 will be disposed against the shaper 14 when the shaper 14 is bent around the roller 12. The length of the sheet 50 can be selected according to the desired size of the finished shape, and the gate 32 can be adjustable on the shaper 14 so that the shaper 14 can be used for sheets 50 of different lengths, the length of each sheet 50 generally determining the circumferential size of the formed sheet 60. If the sheet 50 is longer than the circumference of the formed sheet 60, the formed sheet 60 can be trimmed after forming.

A second shaper 34 similar to the first shaper 14 can also be disposed on the thermoplastic sheet 50 so that the second shaper 34 is rolled around the roller 12 between the sheet 50 and the roller 12, as shown in FIG. 5. The second shaper 34 can be slidably adjustable toward the roller 12, as described above in connection with the first shaper 14. Thus, the first shaper 14 can be advanced a predetermined distance toward the roller 12 to define a maximum outer dimension of the formed sheet 60, and the second shaper 34 can be advanced a predetermined distance toward the roller 12 to urge the sheet 50 radially outward toward the first shaper 14. The shapers 14, 34 can be adjusted radially outward by advancing the rollers 14, 34 after the roller 12 has been rotated to a desired position and held in that position. Alternatively, the shapers 14, 34 can be adjusted radially outward by advancing the shapers 14, 34 while the roller 12 is being rotated, the shapers 14, 34 being advanced at a rate faster than the speed of a periphery of the roller 12. The second shaper 34 can be connected to the roller 12 or the first shaper 14, or the second shaper 34 can be connected to neither. In the illustrated embodiment, however, the second shaper 34 is also attached to the roller 12, albeit at a location spaced circumferentially from the location at which the first shaper 14 is attached to the roller 12 so that the sheet 50 may be disposed therebetween. Additionally, the second shaper 34 can have a gate 35 or other index feature for engaging the sheet 50. As shown, for example, the gate 35 of the second shaper 34 may extend toward the first shaper 14 such that the sheet 50 is retained therebetween.

In another embodiment of the present invention, the apparatus 10 includes one or more radially adjustable members 40, as shown in FIGS. 6 and 7. Each member 40 can be a longitudinal member such as a rod, a shoe, or the like that extends generally parallel to the roller 12. The members 40 are configured to be adjusted relative to the roller 12 to provide support to the shaper 14 and the sheet 50. The members 40 can be adjusted to a first position, shown in FIG. 6, so that the members 40 do not interfere with the entry and bending of the shaper 14 and sheet 50 around the roller 12. The members 40 can then be adjusted toward the roller 12 to bias the shaper 14 and the sheet 50 to a particular configuration. For example, if the shaper 14 and sheet 50 do not maintain a cylindrical shape when bent around the roller 12, the members 40 can be actuated radially inwards, as shown in FIG. 7, to engage the shaper 14 and urge the shaper 14 to the desired configuration. The members 40 can also be used to bend the shaper 14 to other shapes, including shapes with flattened portions or complex curves. Any number of members 40 can be provided in the apparatus 10, and the members 40 need not be straight or extend the entire length of the apparatus 10. Further, the members 40 can be positioned within the shaper 14, i.e., between the sheet 50 and the roller 12, so that the members 40 can be actuated outward toward the sheet 50 and shaper 14.

FIGS. 8 and 9 illustrate an alternative forming apparatus 110 in which a shaper 114, similar to the shaper 14 described above, is supported on a plurality of support members 140 that are supported by a frame 116. The support members 140 can be longitudinal members such as rods or other shapes that are arranged in a generally parallel configuration, as shown in FIG. 8, so that the members 140 define spaces 142 therebetween. In other embodiments, the support members 140 can be arranged in other configurations, in which the support members 140 need not be parallel. A heater 122 can be provided within each member 140 or elsewhere in the apparatus 110, and the apparatus 110 can be partially or completely enclosed by an insulative shroud 118. The thermoplastic sheet 50 is disposed on a first side of the shaper 114, and a second side of the shaper 114 is disposed against the members 140 so that the shaper 114 extends across the spaces 142 between the members 140 and so that the sheet 50 can bend between the members 140, as shown in FIG. 9. The shaper 114 and the sheet 50 can be bent by gravity, or opposing support members 144 can be provided, as shown in FIG. 10, for urging the sheet 50 to a desired configuration. A second shaper 134 can also be provided on the sheet 50 opposite the first shaper 114, as shown in FIG. 10, i.e., between the sheet 50 and the members 144.

Each of the members 140, 144 can be adjustable in position, for example, in a direction transverse to the longitudinal direction of the members 140, 144. Thus, as shown in FIG. 10, each of the members 140, 144 can be adjusted in any direction to determine the shape of the formed sheet 60. The members 140, 144 can be mounted on tracks or other adjustable supporting devices, and each member 140, 144 can be adjusted manually, or actuators can be provided for such adjustment. For example, FIG. 10 illustrates a plurality of actuators 146, each of which is configured to extend or retract a respective one of the members 140, 144 toward or away from the sheet 50.

During one typical method of operation, the shaper 114 is disposed on the members 140, the sheet 50 is disposed on the shaper 114, the second shaper 134 is disposed on the sheet 50, and the members 140, 144 are adjusted to a desired configuration. The heater 122 is used to heat the sheet 50, preferably to a processing temperature that is less than the glass transition temperature of the thermoplastic material of the sheet 50, as described above. The sheet 50 can be maintained at the processing temperature for a predetermined period, after which the heater 122 can be turned off. Preferably, the formed sheet 60 is at least partially cooled in the apparatus 110. The formed sheet 60 is then removed from the apparatus 110.

The support members 140 can define different shapes than that shown in FIGS. 8–10. For example, as shown in FIG. 11, an apparatus 110a can include one or more rod- or tube-shaped support members 140a defining ends that extend from a frame 116a and upon which a shaper 114a can be disposed. The shaper 114a can extend perpendicular to the longitudinal direction of the support member 140a, and the sheet 50 can be disposed on the shaper 114a. Further, the shaper 114a and, hence, the sheet 50 can be elastically deformed to a compound contour, i.e., bent about more than one axis. For example, as shown in FIG. 11, the shaper 114a can define a partial spherical surface.

As described above, the edges 68, 70 or other portions of the formed sheet 60 can be joined, for example, by consolidation joining. Further, the formed sheet 60 can be post-formed to provide additional contours or features, such as bells, beads, and the like. A discussion regarding the formation of features such as bells and beads through post-forming, i.e., after the forming and/or the consolidation joining of the sheet, is provided in U.S. application Ser. No. 10/215,780, titled "Post-Forming of Thermoplastic Ducts" filed Aug. 9, 2002, which is assigned to the Assignee of the present invention and the entirety of which is incorporated herein by reference. It is also appreciated that marks can be provided on the thermoplastic sheet, for example, to accurately identify the location of such post-formed features or to facilitate the manufacture or assembly of the formed sheets, as provided in the application entitled "Thermoplastic Laminate Duct."

Many modifications and other embodiments of the invention will come to mind to one skilled in the art to which this invention pertains having the benefit of the teachings presented in the foregoing descriptions and the associated drawings. For example, it is appreciated that each of the components of the described apparatuses can be formed of a variety of materials such as aluminum, steel, and alloys thereof, and each of the working surfaces of the apparatuses can include a low friction layer or release layer, e.g., Teflon®, registered trademark of E.I. du Pont de Nemours and Company. The release layer can be a durable layer of material or a release agent that is wiped or sprayed periodically onto the working surfaces. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for forming a thermoplastic sheet, the apparatus comprising:
   a rotatable roller extending longitudinally;
   an elastically flexible shaper having first and second sides and extending from a first edge to a second edge; and
   a heater configured to heat the thermoplastic sheet to a processing temperature less than a glass transition temperature of the thermoplastic member;
   wherein said shaper is configured to receive the thermoplastic sheet on said first side such that rotation of said roller in a first direction advances said first edge at least partially around said roller with said first side directed toward said roller and the thermoplastic sheet disposed between said roller and said shaper, thereby bending the thermoplastic sheet.

2. An apparatus according to claim 1, further comprising at least one longitudinal member extending generally parallel with said roller and configured to adjust inward toward the roller to bend the thermoplastic sheet to a predetermined configuration.

3. An apparatus according to claim 1, further comprising an index feature on said shaper, said index feature configured to engage the thermoplastic sheet such that the adjustment of the index feature toward said roller advances the thermoplastic sheet around said roller.

4. An apparatus according to claim 1, further comprising a second elastically flexible shaper configured to be disposed on the thermoplastic sheet such that rotation of said roller in the first direction advances the second shaper at least partially around said roller with said second shaper disposed between the thermoplastic sheet and said roller, and advancement of said second shaper toward said roller urges a portion of the thermoplastic sheet disposed around said roller in a direction generally outward from said roller.

5. An apparatus according to claim 1, further comprising a heat shroud at least partially enclosing said roller.

6. An apparatus for forming a thermoplastic sheet, the apparatus comprising:
   at least three support members defining spaces therebetween;
   an elastically flexible shaper having first and second sides and extending from a first edge to a second edge, said shaper configured to be disposed with said second side against said support members such that said shaper extends across the spaces between said support members; and
   a heater configured to heat the thermoplastic sheet to a processing temperature less than a glass transition temperature of the thermoplastic member,
   wherein said shaper is configured to receive the thermoplastic sheet on said first side and bend partially around said support members such that the thermoplastic sheet is formed to a predetermined shape.

7. An apparatus according to claim 6, wherein each support member extends in a longitudinal direction such that said support members are generally parallel.

8. An apparatus according to claim 7, wherein at least one of the support members is configured to be adjusted in a direction perpendicular to the longitudinal direction of the support members.

9. An apparatus according to claim 6, further comprising a heat shroud at least partially enclosing said support members.

10. An apparatus according to claim 1 wherein one of the edges of said shaper is connected to said roller.

11. An apparatus according to claim 1 wherein one of the edges of said shaper is configured to be advanced at least about 360° about said roller.

12. An apparatus according to claim 1, further comprising at least two longitudinal members extending generally parallel with said roller and configured to adjust radially inward toward the roller to bend the thermoplastic sheet to a predetermined configuration.

13. An apparatus according to claim 3 wherein said index feature on said shaper is configured to contact an edge of the thermoplastic sheet.

* * * * *